United States Patent
Lee et al.

(10) Patent No.: US 7,224,671 B2
(45) Date of Patent: May 29, 2007

(54) METHOD AND APPARATUS FOR LOAD BALANCING IN NETWORK PROCESSING DEVICE

(75) Inventors: Eugene Lee, San Jose, CA (US); Somsubhra Sikdar, San Jose, CA (US); Andy Liu, Fremont, CA (US); Ann Gui, Cupertino, CA (US)

(73) Assignee: Force10 Networks, Inc., San Jose, CA (US)

( * ) Notice: Subject to any disclaimer, the term of this patent is extended or adjusted under 35 U.S.C. 154(b) by 969 days.

(21) Appl. No.: 09/930,764

(22) Filed: Aug. 15, 2001

(65) Prior Publication Data

US 2002/0048280 A1   Apr. 25, 2002

Related U.S. Application Data

(63) Continuation-in-part of application No. 09/676,046, filed on Sep. 28, 2000.

(51) Int. Cl.
*G08C 15/00* (2006.01)
*H04J 3/14* (2006.01)
*H04L 12/26* (2006.01)
*H04L 12/28* (2006.01)
*H04L 12/56* (2006.01)

(52) U.S. Cl. ..................... 370/235; 370/422

(58) Field of Classification Search .............. 370/412, 370/415, 416, 422, 468, 229, 235
See application file for complete search history.

(56) References Cited

U.S. PATENT DOCUMENTS

| | | | | |
|---|---|---|---|---|
| 6,449,283 | B1* | 9/2002 | Chao et al. | 370/461 |
| 6,810,031 | B1* | 10/2004 | Hegde et al. | 370/351 |
| 2004/0081185 | A1* | 4/2004 | Grow | 370/418 |

* cited by examiner

*Primary Examiner*—Kevin C. Harper
(74) *Attorney, Agent, or Firm*—James E Harris

(57) ABSTRACT

A data rate controller controls a rate that data is transferred over a backplane in a network processing device. A bandwidth allocator allocates bandwidth to an input port for transmitting data over the backplane to an output port. A bandwidth limiter identifies a maximum allowable bandwidth the input port is allocated on the backplane. A bandwidth tracker identifies an amount of bandwidth currently allocated to the input port for transmitting data over the backplane to the output port. When the current allocated bandwidth is used up, the data rate controller prevents that input port from connecting to output ports through the backplane until more bandwidth is allocated.

15 Claims, 13 Drawing Sheets

METHOD AND APPARATUS FOR LOAD BALANCING IN NETWORK PROCESSING DEVICE

The present invention is a continuation in part of U.S. patent application Ser. No. 09/676,046, Filed Sep. 28, 2000, entitled: SCHEDULING AND ARBITRATION SCHEME FOR NETWORK PROCESSING DEVICE.

BACKGROUND OF THE INVENTION

A network processing device, such as a router or switch, receives packets at multiple input ports. The network processing device receives these incoming packets at the input ports and routes the packets to appropriate destinations through corresponding output ports. Headers in the packets identify which output ports should be used for transmitting the packets. The incoming packets from the input ports are temporarily stored in buffers until the appropriate output ports are ready to forward the packets toward the appropriate destination addresses. It is desirable to route these packets as quickly and efficiently as possible to the corresponding output ports.

Problems arise when multiple input ports request access to the same output ports at the same time. If one input port continuously has high priority or high weight packets (large number of bytes), lower priority or lower weight packets (small number of bytes) have to wait long periods of time before gaining access to the targeted output port. Different arbitration schemes are used to determine what order the packets at input ports are granted access the different output ports. Present arbitration schemes do not fairly and efficiently arbitrate among the requesting input ports.

The present invention addresses this and other problems associated with the prior art.

SUMMARY OF THE INVENTION

A data rate controller controls a rate that data is transferred over a backplane in a network processing device. A bandwidth allocator allocates bandwidth to an input port for transmitting data over the backplane to an output port. A bandwidth limiter identifies a maximum allowable bandwidth the input port is allocated on the backplane. A bandwidth tracker identifies an amount of bandwidth currently allocated to the input port for transmitting data over the backplane to the output port. When the current allocated bandwidth is used up, the data rate controller prevents that input port from connecting to output ports through the backplane until more bandwidth is allocated.

The foregoing and other objects, features and advantages of the invention will become more readily apparent from the following detailed description of a preferred embodiment of the invention which proceeds with reference to the accompanying drawings.

DETAILED DESCRIPTION

Figure 1:
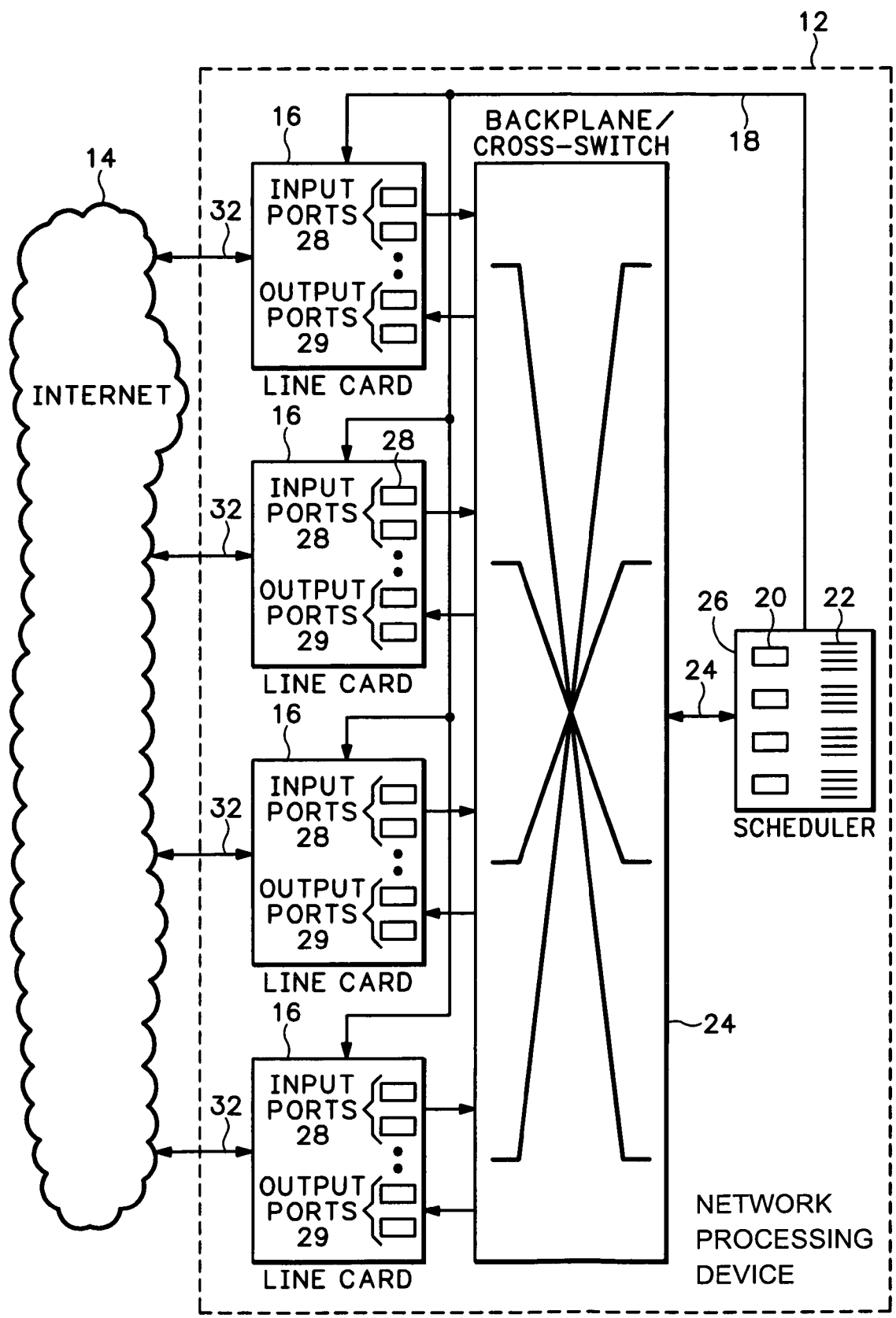
FIG. 1 is diagram of a network processing device.

FIG. 1 shows a network processing device 12 connected to an Internet network 14. Multiple connections 32 couple the network processing device 12 to the Internet 14. The different connections 32 are connected to different routing locations in Internet 14. The connections 32 are coupled to Line Interface Cards (LICs) 16. The LICs 16 each receive packets over the Internet 14 at input ports 28 and then request grants from scheduler 26 to send the received packet to output ports 29 for routing to different destination addresses.

When one of the input ports 28 receives one or more packets, that input port 28 makes a request over control bus 18 to scheduler 26 to send the packets over a back plane cross switch 24 to a particular one of the output ports 29. The scheduler 26 includes arbiters 20 for each output port 20. Separate output port arbitrations are conducted for each output port 29 by a different arbiter 20. The arbiters 20 each conduct an output port arbitration for all of the input ports 28 requesting the same output port 29. The scheduler 26 sends back a grant signal over control bus 18 to the particular input port 29 winning the output port arbitration.

Each input port has a group of associated Virtual Output Queues (VOQs) 22. One VOQ for each input port 28 is dedicated to a different output port 29. Multiple grants may be received for multiple VOQs for the same input port. A second input port arbitration is conducted when multiple VOQs 22 for the same input port 28 receive grants from different output ports 29. The arbiters 20 in scheduler 26 selects one of the granted VOQs for the input port 28 to win the input port arbitration. The winning VOQ 22 sends an accept signal back to the granting arbiter 20. Any grants that are not accepted go through another arbitration iteration. This arbitration scheme is repeated until convergence where no remaining unmatched output ports can be matched with any remaining unmatched input ports.

At the completion of a current time slot, the scheduler 26 reconfigures the cross switch 24 through control line 24 to connect the accepting input ports 28 to their granting output ports 29. A time slot is a predetermined amount of time allotted for sending packets from the input ports to the output ports. The input ports 28 then send packets identified in the VOQs to their connected output ports 29 during the next time slot.

Virtual Output Queues

Figure 2:
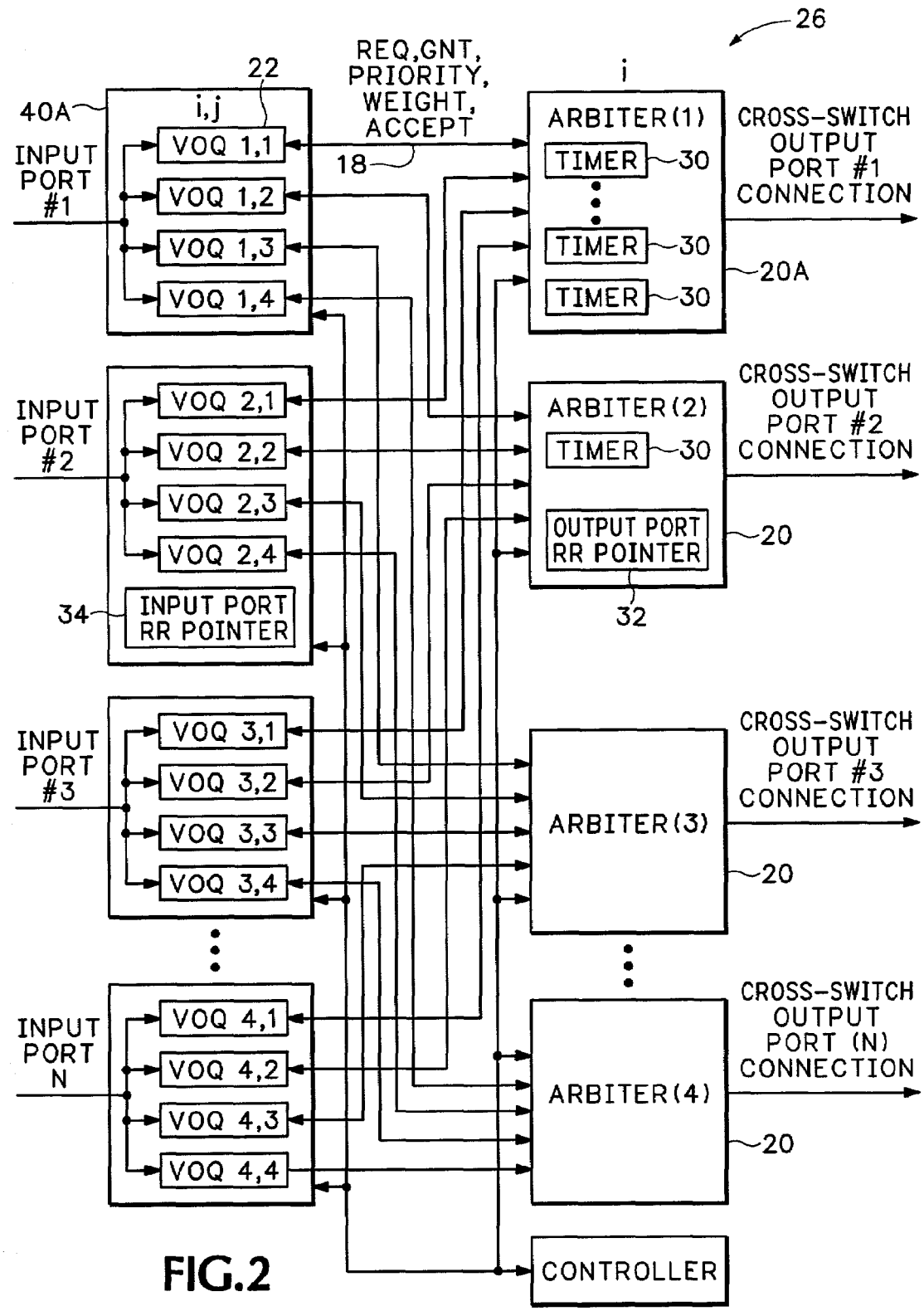
FIG. 2 is a detailed diagram of a scheduler shown in FIG. 1.

FIG. 2 is a more detailed diagram of the scheduler 26 shown in FIG. 1. The scheduler 26 performs a unicast arbitration and/or a multicast arbitration. Each input port 28 has an associated set of VOQ's 22. For example, VOQ(1,1), VOQ(1,2), VOQ(1,3), and VOQ(1,4) all contain addresses for packets received and stored for input port #1. Each VOQ for each input port is also dedicated to a different one of the output ports. For example, VOQ (1,1) is dedicated to output port #1, VOQ (1,2) is dedicated to output port #2, VOQ (1,3) is dedicated to output port #3 and VOQ (1,4) is dedicated to output port #4.

All the VOQ's for the same output port are arbitrated by the same arbiter 20. For example, arbiter (1) arbitrates among all input ports requesting connections to output port #1. The virtual output queues VOQ(1,1) for input port #1, VOQ (2,1) for input port #2, VOQ (3,1) for input port #3, and VOQ (4,1) for input port #4 are all arbitrated by arbiter(1). Similarly, VOQ (1,4), VOQ (2,4), VOQ (3,4) and VOQ (4,4) are all arbitrated by arbiter(4). Only four output ports are shown in the example in FIG. 2. However, it should be understood that any number of input ports and output ports can be used. The arbiters 20 can be implemented by programmable logic devices, discrete devices or in software using a software programmable device.

The VOQ's 42 prevent Head-of-Line blocking. The VOQs contain a linked list of memory addresses for packets having addresses directed to an associated one of the output ports. The VOQ's can independently request connections to their associated output ports and can be independently be granted a connection request from their dedicated output ports. Thus, packets coming into one of the input ports and directed to a first output port will not block requests from packets coming into that same input port but directed to a different VOQ output port. This means that low priority packets will not block connections requests from other higher priority packets.

Multiparameter Arbitration Scheme

Different arbitration parameters are used by the arbiters 20 to determine which VOQs 42 are granted output ports. A Largest Weight First (LWF) arbitration is used to provide high stability for the network traffic. Each trunk of packet data accumulated in each input queue counts as one weight.

"One weight" represents the amount of data in bytes that an input port can forward to and output in one Epoch slot time. For the first weight of data, weight is represented by the range of one minimum packet (64-byte) for one Epoch data. This means that if there is one minimum packet stored in the input port, it has a weight of one. When the data accumulated is more than one epoch data, a counter is increment by one. Now the weight is equal to two. The epoch data depends on the slot time. The larger the slot time, the larger the amount of epoch data in bytes.

A Highest Priority First (HPF) arbitration is used for providing high throughput and low latency for packets with the highest priority. Priority values are user configurable and are contained in the packet headers. For example, a user may select a high priority for sending Voice Over IP packets.

An Oldest Request First (ORF) arbitration prevents starvation of packets with low priority and low weight. The ORF arbitration upgrades packets in any VOQ to the highest priority when those packets have not been serviced during a predetermined time period. The scheduler includes timers 30 for identifying VOQs that have requested, but not received, output port connections for some predetermined amount of time. After one of the timers 30 has timed out, the scheduler moves the associated VOQ to a highest priority. This eliminates packet starvation and guarantees every request from each VOQ will be serviced by an output port within a predetermined time period ensuring non-empty VOQs will not go unserved indefinitely A Round-Robin Matching (RRM) arbitration provides fairness. Each input port arbitration and each output port arbitration has a round-robin matching pointer. The RRM arbitration monitors the weight and priority of all VOQs during both output port arbitration and input port arbitration. If two or more VOQ's have the same priority and weight, the RRM pointer is used as a tie breaker. An output port RR pointer 32 (FIG. 2) is used in each arbiter 20 for output port RRM and an input port RR pointer 34 (FIG. 2) exists for each input port for RRM during input port arbitration.

The ORF, HPF, LWF and RRM arbitration parameters are used in different combinations and in different orders by the scheduler to provide a simple and intelligent mechanism to achieve a high speed, high bandwidth switch system.

Output Port Arbitration

Figure 3:
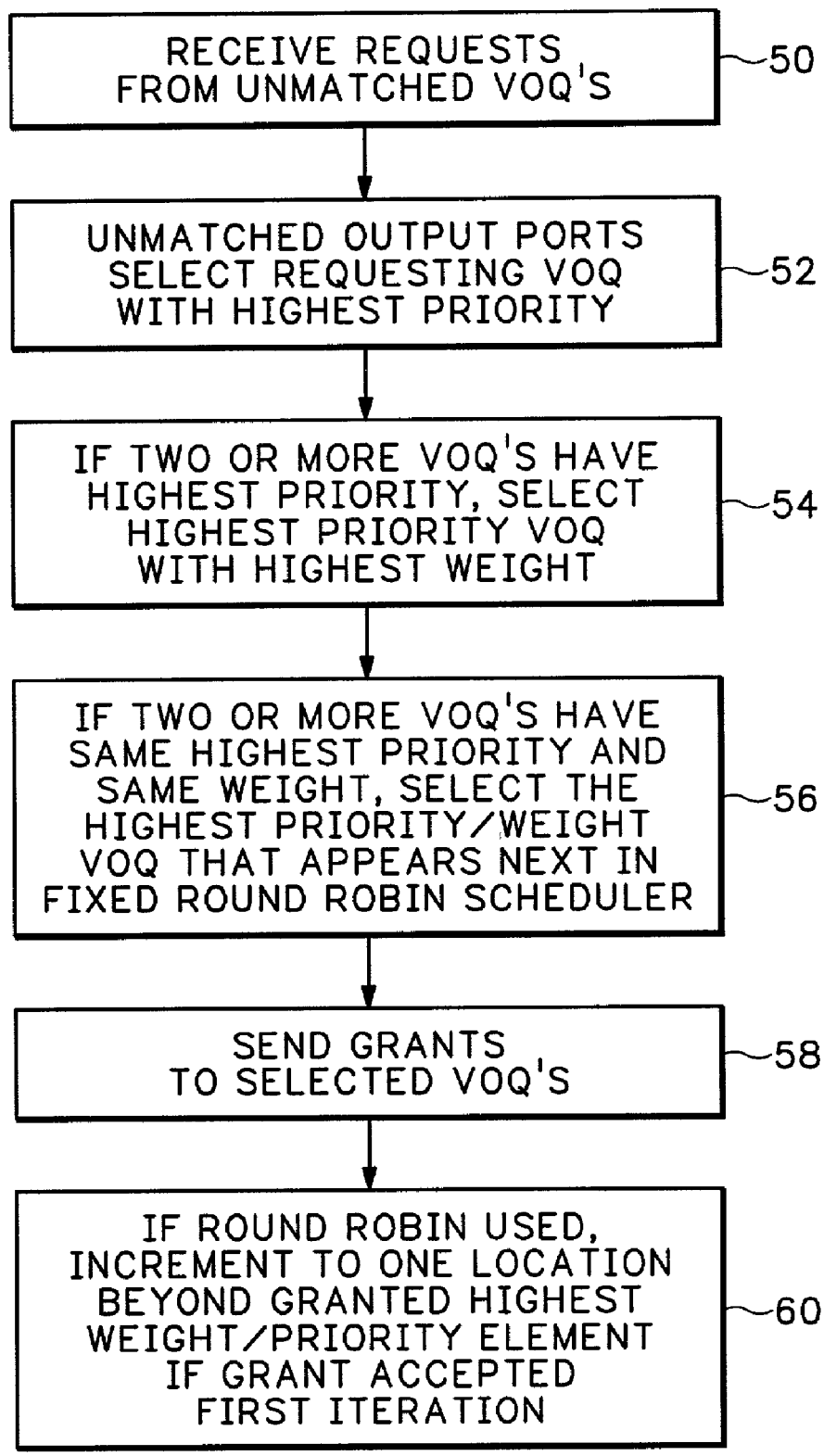
FIG. 3 is a flow diagram showing how output port arbitration is conducted in the scheduler.

FIG. 3 explains in more detail how the arbiters 20 in FIG. 2 each arbitrate requests from the different VOQs 22 for connection through the cross switch 24 for an upcoming time slot. In block 50 the arbiters for each output port receive requests from the unmatched VOQs dedicated to that same output port. If an unmatched output port receives any requests in block 52, the highest priority request is serviced first. If the same arbiter receives two or more of the same highest priority requests, the highest priority request with the largest weight will be serviced first in block 54.

Different combinations of the weight and priority can be used. For example, weight may be the first parameter used by the arbiter to select a VOQ. In this case, if two or more VOQs have the same largest weight, then the VOQ with the largest weight and highest priority is selected.

In another arbitration variation, the highest priorities over a certain threshold may be used first to base selection. If there are no VOQs over this priority threshold, then the output queue may select VOQ's that are over a particular weight threshold. If there are no VOQ's over the priority and weight thresholds, the output queues may use either the priority or weight values under the threshold, or a combination of both.

If two or more requests have the same highest priority and same highest weight, a round-robin arbitration is used in block 56 to determine which one of the requests is serviced first. The arbiter selects the request from the VOQ with the highest priority/weight that appears next in the output port round-robin pointer 32 (FIG. 2). In block 58, each output port notifies the winning VOQ by sending a grant signal. The round robin pointer is incremented to the next VOQ beyond the granted highest weight/priority in block 60 only if the grant is accepted.

Figure 4:
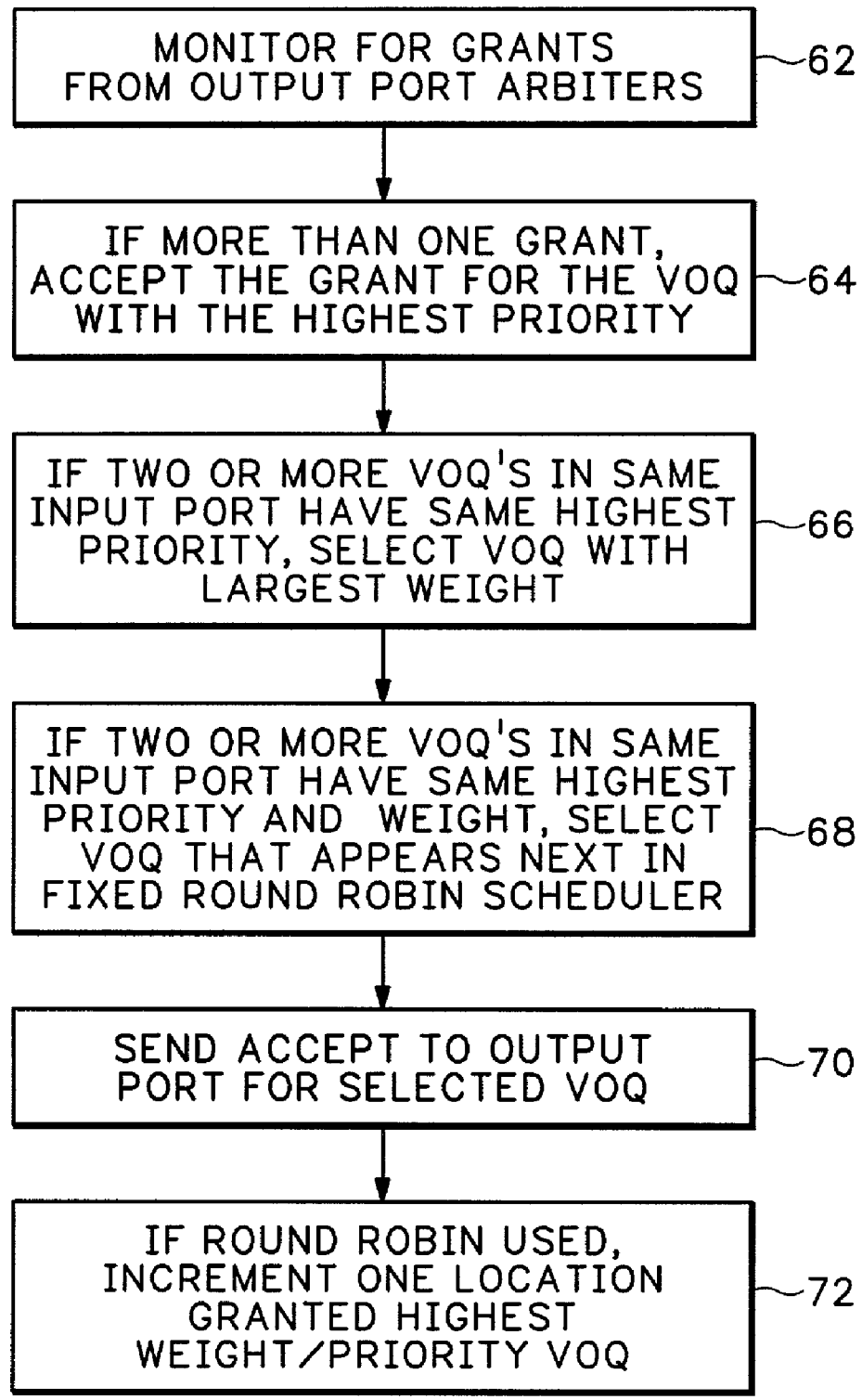
FIG. 4 is a flow diagram showing how input port arbitration is conducted in the scheduler.

FIG. 4 explains the arbitration conducted for each input port. Each input port detects any grants received back from one or more output ports in block 62. If multiple unmatched VOQ's for the same input port receive grants, the input port in block 64 accepts the grant for the VOQ with the highest priority.

If two or more VOQs receiving grants for the same input port have the same highest priority, then the VOQ with the highest priority and largest weight is selected in block 66. If two or more VOQs for the same input port have the same highest priority and the same weight, then the VOQ that appears next in the input port roundrobin pointer 34 (FIG. 2) is selected in block 68. An accept signal is sent to the output port associated with the selected VOQ in block 70.

The pointer 34 in FIG. 2 starts from the highest weight/priority VOQ. In the next time slot, the pointer 32 moves to the next VOQ. The round-robin scheduler is incremented to one location beyond the accepted output port only if that input is matched in the first iteration of the arbitration.

In a manner similar to the output ports described in FIG. 3, arbitration of To multiple granted VOQs can be alternatively based first on weight and then on priority or any other combination of both priority and weight.

Figure 5:
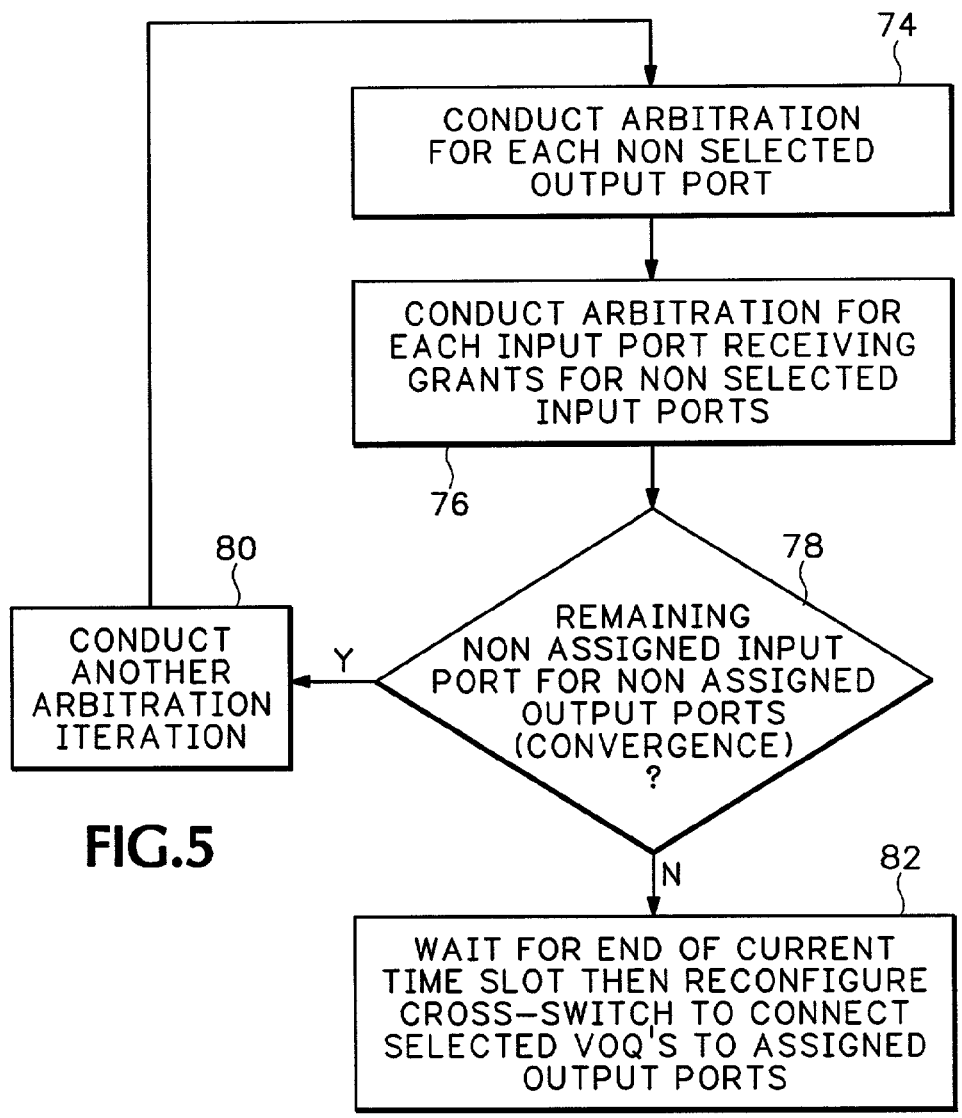
FIG. 5 is a flow diagram showing how output port arbitration and input port arbitration are conducted over multiple arbitration iterations.

FIG. 5 shows how the arbitration scheme is repeated until convergence. For any time slot, the highest VOQ request will be selected for connection first. But there is no guarantee the second highest priority (or alternatively second largest weight) VOQ will be granted a connection to its requested output port.

After the first arbitration iteration, several output ports may still not be matched with VOQs from one of the input ports. This occurs when multiple output ports issue grants to the same input port. Since the input ports only accepts one grant from one output port, the output ports whose grants are not accepted go back into a pool for a next arbitration iteration.

The arbitration will converge in at most N iterations, where N is the number of output ports. Each iteration will schedule zero, one or more connections. If zero connections are scheduled during an iteration, then the arbitration has converged and no more connections can be added with additional arbitration iterations. The slowest convergence will occur if exactly one connection is scheduled per iteration. At most N connections can be scheduled (one to every input and one to every output) which means the arbitration will converge in at most N iterations.

With one arbitration iteration, and under heavy load, VOQs with a common output all have the same throughput if all priority and weight are the same. For the matching algorithm that consists of more than one iteration, and under heavy load,. VOQs with the same output port may each have a different throughput if all priority and weight are the same.

Block 74 conducts the output port arbitration for all nonselected output ports. In block 76 an arbitration is conducted for VOQs issued grants by the nonselected input ports. If there are still requests remaining for nonassinged output ports in decision block 78, block 80 returns for another arbitration iteration. If there are no remaining nonassinged input port connection requests for nonselected output ports, the scheduler stops any more arbitration iterations. In block 82, the scheduler waits for the current time slot to complete and then configures the cross switch to connect the selected VOQ's to their assigned output ports.

Starvation

Figure 6:
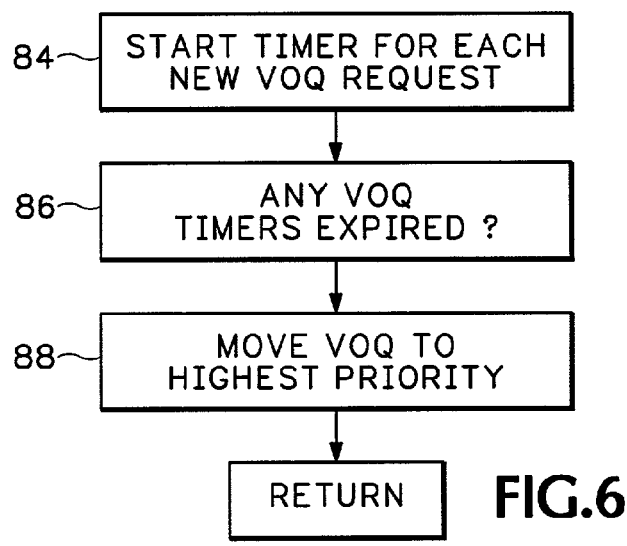
FIG. 6 is a flow diagram showing how input ports are prevented from starvation.

Referring to FIG. 6, the scheduler guarantees that no input will be starved for a connection and guarantees every VOQ will be serviced once during a predetermined number of time slots. In block 84, the scheduler starts the timers 30 in FIG. 2 whenever any VOQ makes a new connection request. If any of the timers expire in decision block 86, the scheduler automatically makes that VOQ highest priority for the arbitration conducted for the next time slot. This guarantees that the VOQs will be connected to output ports within a predetermined amount of time.

Unicast and Multicast Scheduling

Figure 7:
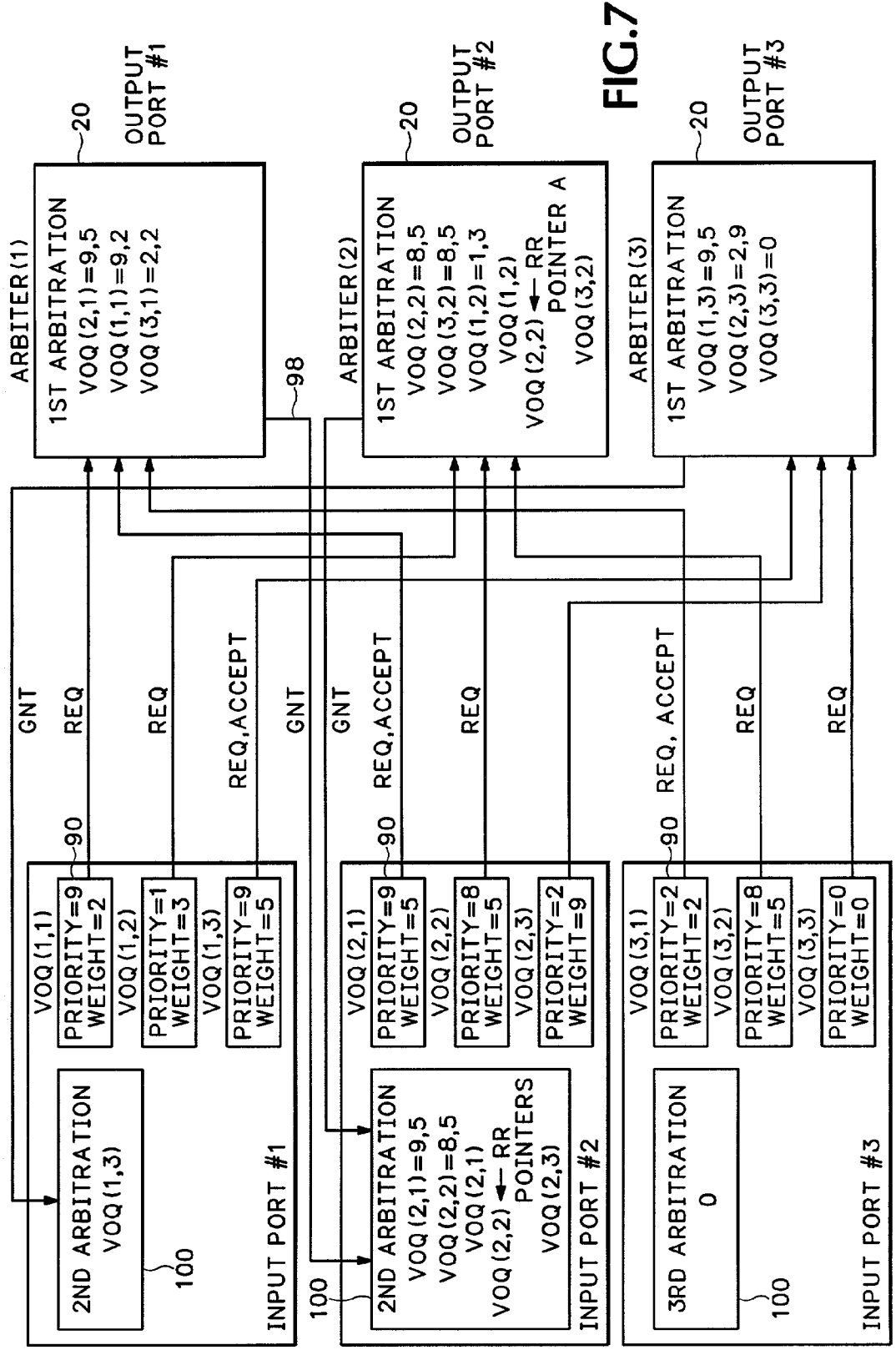
FIG. 7 is a block diagram of the scheduler showing one example of unicast arbitration.

The arbiters can arbitrate either unicast connection requests, multicast connection requests or both for the same time slots. FIG. 7 shows how the arbiters conduct arbitration for unicast packets.

Three input ports each have three associated Virtual Output Queues (VOQs). Input port #1 includes VOQ(1,1), VOQ(1,2) and VOQ(1,3). The VOQ(1,1) is dedicated to output port #1, VOQ(1,2) is dedicated to output port #2, and VOQ(1,3) is dedicated to output port #3. In a similar manner, input port #2 has VOQ(2,1) dedicated to output port #1, VOQ(2,2) dedicated to output port #2, and VOQ(2,3) dedicated to output port #3. Input port #3 has three VOQs dedicated in a similar manner to the three output ports. Again, the three input ports and three output ports are shown for illustration only. The network processing device may have any number of input ports, output ports and VOQs.

Each VOQ includes a register 90 that identifies the priority and weight for the packets requesting connection to the output ports. For example, the register 90 for VOQ(1,1) contains a priority of nine and a weight of two.

All VOQs(i,j) with a weight greater than zero send a request to their dedicated output port arbiter. A weight greater than zero indicates that there is at least one minimum packet (64-byte) assigned to that VOQ. Each arbiter(i) selects the highest priority and weight as the one to grant back to the input VOQ(i,j).

For example, arbiter(1) receives requests from VOQ(1,1), VOQ(2,1) and VOQ(3,1). The VOQ(1,1) and VOQ(2,1) both have the same highest priority value of nine. Therefore, arbiter(1) compares the weight of VOQ(1,1) with the weight of VOQ(2, 1). Because, VOQ(2, 1) has a weight of five and VOQ(1,1) only has a weight of two, VOQ(2,1) wins the arbitration. Thus, VOQ(2,1) is issued a grant 98 from arbiter(1). The arbitration for output port #2 includes requests from VOQ(1,2), VOQ(2,2), and VOQ(3,2). Both VOQ(2,2) and VOQ(3,2) have the same highest priority of eight. The arbiter(2) then compares the weight of VOQ(2,2) and VOQ(3,2). Because VOQ(2,2) and VOQ(3,2) both have the same weight of five, arbiter(2) goes to a round robin arbitration. The RR pointer in arbiter(2) currently points at VOQ(2,2). Therefore, VOQ(2,2) in input port #2 is issued the grant for output port #2.

Arbiter(3) performs an arbitration between VOQ(1,3) and VOQ(2,3). The VOQ(3,3) does not have any packets (weight=0) and therefore does not participate in the arbitration for output port #3. Arbiter(3) sends the grant to input port #1 because VOQ(1,3) has the highest priority of nine.

The same arbiter(i) is used to perform the priority and weight arbitration for input port(i) and accepts the highest priority and weight as the one to accept the connection with the granted output port. For example, input port #1 only received one grant by arbiter(3) for VOQ(1,3). Therefore, VOQ(1,3) will accept the connection to output port#3.

For input port #2, both VOQ(2,1) and VOQ(2,2) receive grants from arbiter(1) and arbiter(2), respectively. Because VOQ(2,1) has a higher priority than VOQ(2,2), VOQ(2,1) accepts the grant from arbiter(1) for output port #1. No second arbitration is conducted for input port #3 since none of the VOQs for input port #3 received grants. If any VOQ(i,j) accepts a grant from one of the output ports (j), that VOQ(i,j) does not participate in any further arbitration iterations for the next time slot. Otherwise, the unmatched VOQs compete in another arbitration iteration. The arbitration iterations stop when no unmatched input ports can be matched with unmatched output ports or the iteration counter is equal to the programmed maximum iteration number.

Input port #1 accepted a grant to output port #3 and input port #2 accepted a grant to output port #1 in the first arbitration iteration. Therefore, another arbitration iteration can be conducted with the remaining unassigned VOQs for input port #3 and output port #2. In the second iteration, VOQ(3,2) is assigned to output port #2. After the second iteration, all input ports are matched to output ports (convergence). Thus, the arbitration is completed for the next time slot.

After completion of the current time slot, the scheduler reconfigures the cross switch so that VOQ(2,1) is connected to output port #1, VOQ(3,2) is connected to output port #2 and VOQ(1,3) is connected to output port #3.

Figure 8:
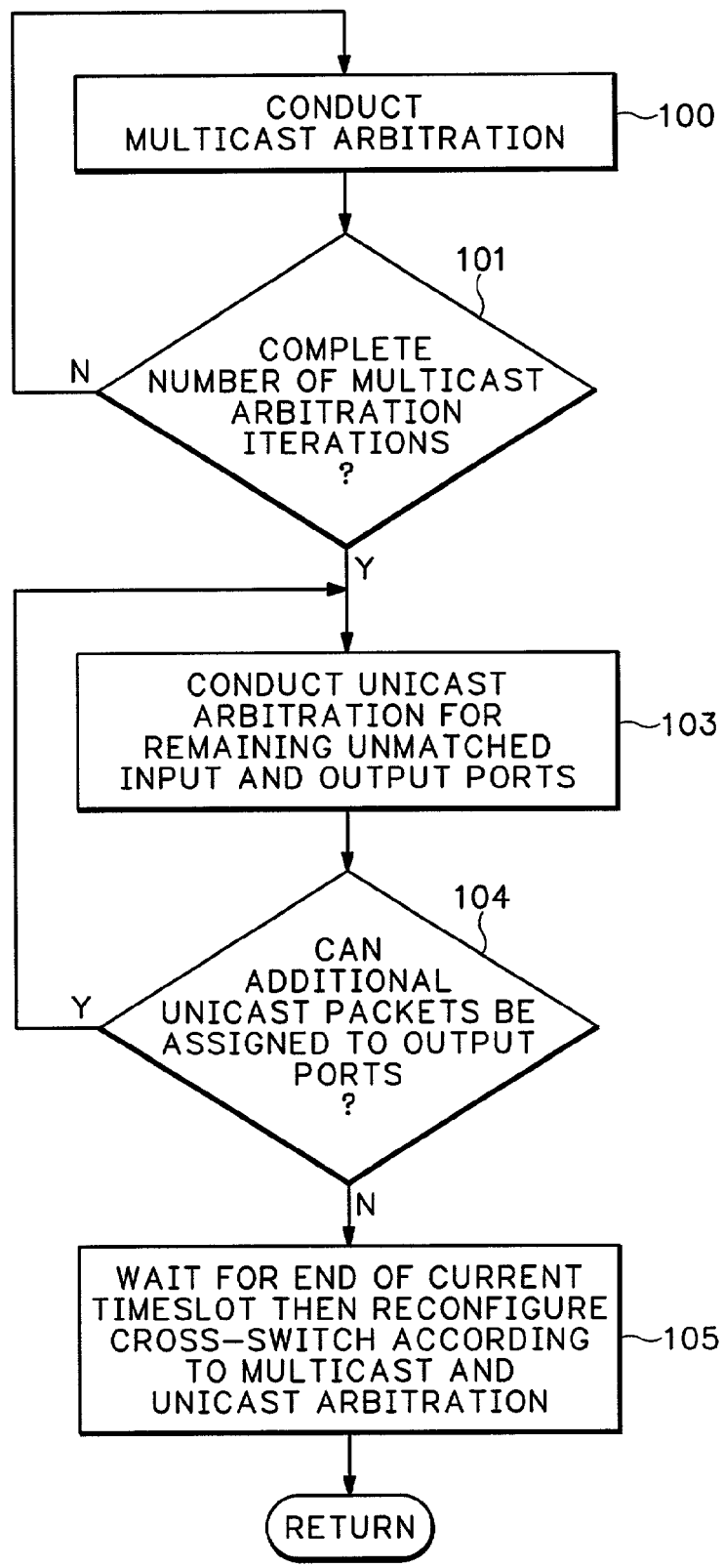
FIG. 8 is a flow diagram showing how dual multicast and unicast arbitration is conducted by the scheduler.

FIG. 8 shows how both multicast arbitration and unicast arbitration are conducted for assigning connections during the same time slot. In block 100 the scheduler conducts a multicast arbitration for any multicast vectors received at the input ports. Multicast vectors identify the priority and weight of a multicast packet and identifies all of the output ports where the multicast needs to be sent. A multicast packet is a packet sent to more than one destination at the same time. For example, when the same email is sent to multiple recipients, that email is sent using multicast packets.

The scheduler in decision block 101 determines when to switch from multicast to unicast arbitration. For the multicast arbitration slot time, the scheduler will not switch to unicast arbitration until all MCGs have been through a predetermined number of iterations. For example, if there are 8 MCGs, that requires at least 8 iterations before switching to unicast arbitration. In multicast iteration, it may not always be possible to find a set of output ports to match the MCGV of the inputs, except for the first iteration. That means, the second and later iterations for the multicast might not find a match for input-output.

Unicast arbitration is conducted for in block 103 is the same as described above in FIG. 7. After the first unicast arbitration iteration in block 103, the scheduler determines in decision block 104 if there are any additional unmatched unicast packets that can be assigned to unmatched output ports. If there are, an additional unicast arbitration iteration is conducted. If there are no more unmatched unicast packets that can be assigned to unmatched output ports, the scheduler in block 105 waits for the end of the current time slot. The cross switch is then reconfigured according to the multicast and unicast arbitrations. The input ports then send their packets through the configured cross switch to the output ports during the next time slot.

Figure 9:
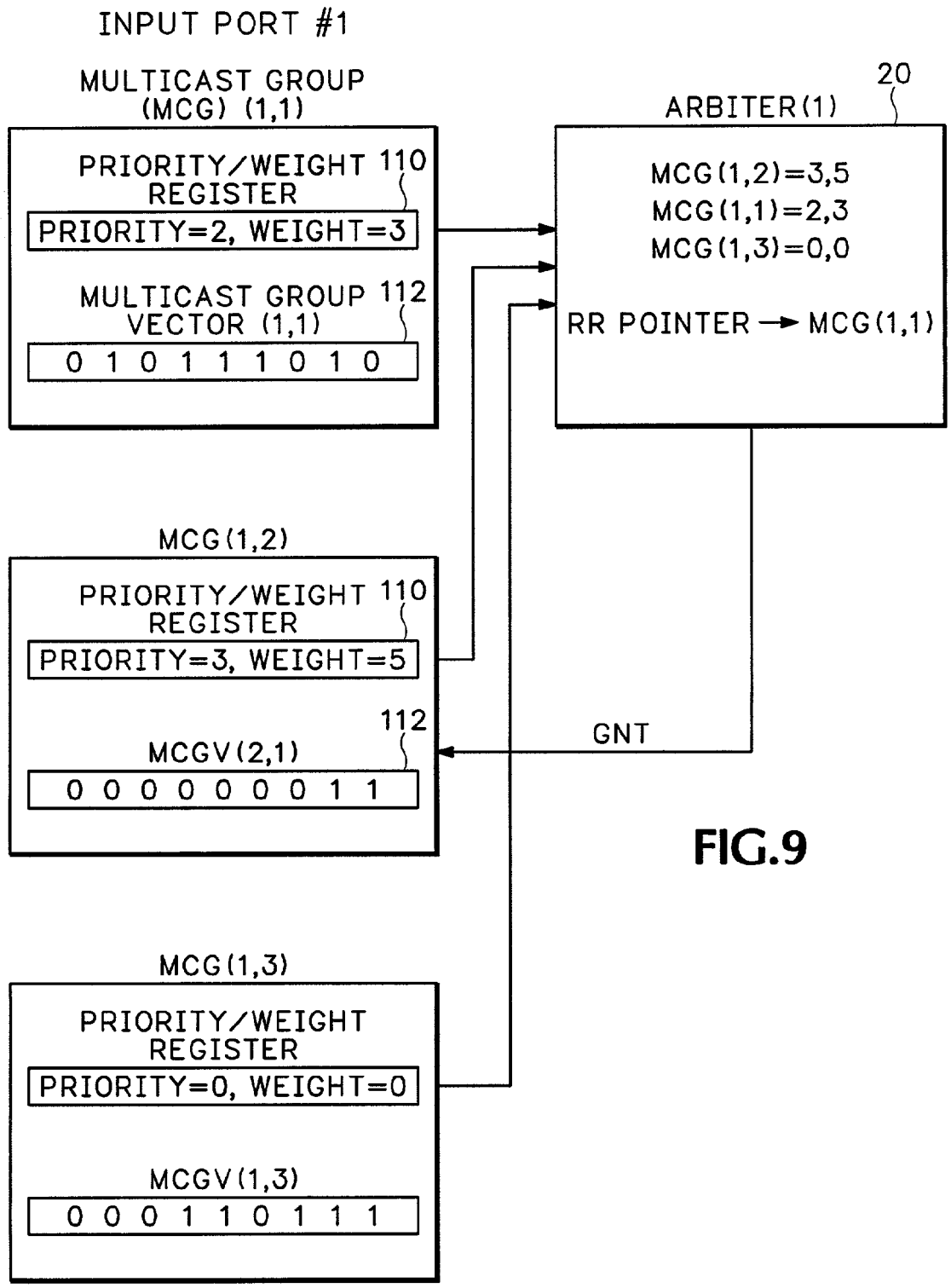
FIG. 9 is a block diagram showing one example of input port multicast arbitration.

FIG. 9 shows an example of how a first phase of multicast arbitration is conducted. Instead of first arbitrating for the output ports, the multicast arbitration first arbitrates for the input ports. Each input port has multiple multicast groups, each multicast group has one priority/weight register 110 and a multicast group vector (MCGV) 112. Each bit in the MCGV 112 is dedicated to one of the output ports. A binary "1" value in the MCGV 112 indicates that the multicast packet is directed to an associated output port.

Input port scheduling identifies the highest priority/weight multicast group for each input port. In the example shown in FIG. 9, three multicast groups, MCG(1,1), MCG(1,2), and MCG(1,3) for input port #1 are arbitrated by arbiter(1).

The MCG(1,2) has the highest priority/weight and wins the input port arbitration for input port #1. However, if there were more than one multicast group with the same highest priority/weight, then the round-robin scheme would be used to select the multicast group. The RR pointer would then be moved to the next group in the list.

At the end of this first input port iteration, every input port has selected one and only one MCG to complete for the output ports. For the case of input port #1, arbiter(1) has selected MCG(1,2). Each input port has one VOQ(i,j) dedicated to each output port. Each MCGV 112 has one bit allocated for each output port and one priority/weight value in register 110. The winning priority/weight value from the input port multicast arbitration is loaded into each VOQ(i,j) associated with MCGV(i,j) >0. Otherwise, VOQ(i,j) is loaded with a "0" value (no request). The Priority and Weight for the winning MCG for a particular input port gets loaded into each VOQ for that input port that does not have zero MCGV.

Each MCG has it's own Priority and weight, that is the same as unicast. In the input port, each unicast and multicast is handled the same way except multicast has it's own MCG vector for multiple outputs. Every received multicast packet will be stored in one of the MCGs. Each MCG has it's own priority as well, therefore, each MCG has different weight and priority.

During multicast arbitration, the MCGs are first arbitrated within the same input port according to their own priority and weights. Second, the priority and weight of the winner is loaded to all the VOQs (share the same VOQs with unicast) with MCGV >0. Otherwise, the VOQs are loaded with 0.

Each request to the same output port arbiter(1) represents one input from one of the multicast groups MCG(i,j). The highest priority/weight multicast group is issued a grant. Again, if there is more than one MCG with the same highest priority/weight, a Round-Robin arbitration is conducted. One global RR pointer is used for all output ports, and is incremented by one for each multicast time slot.

All the grants from the output port arbitrations are returned back to the winning MCG(i,j). Each MCG(i,j) compares the granted MCG(i,j) with the MCGV(i,j), if they match bit-by-bit, this input MCG(i,j) accepts the grant, and removes itself and the granted output ports from the next multicast iteration. The output port arbitration is repeated once for each MCG.

When the multicast arbitration is completed, the unicast arbitration takes over. The first thing the scheduler does is load all the unicast priority and weight values to all VOQs from the unicast VOQ buffers before starting a unicast arbitration iteration.

Figure 11:
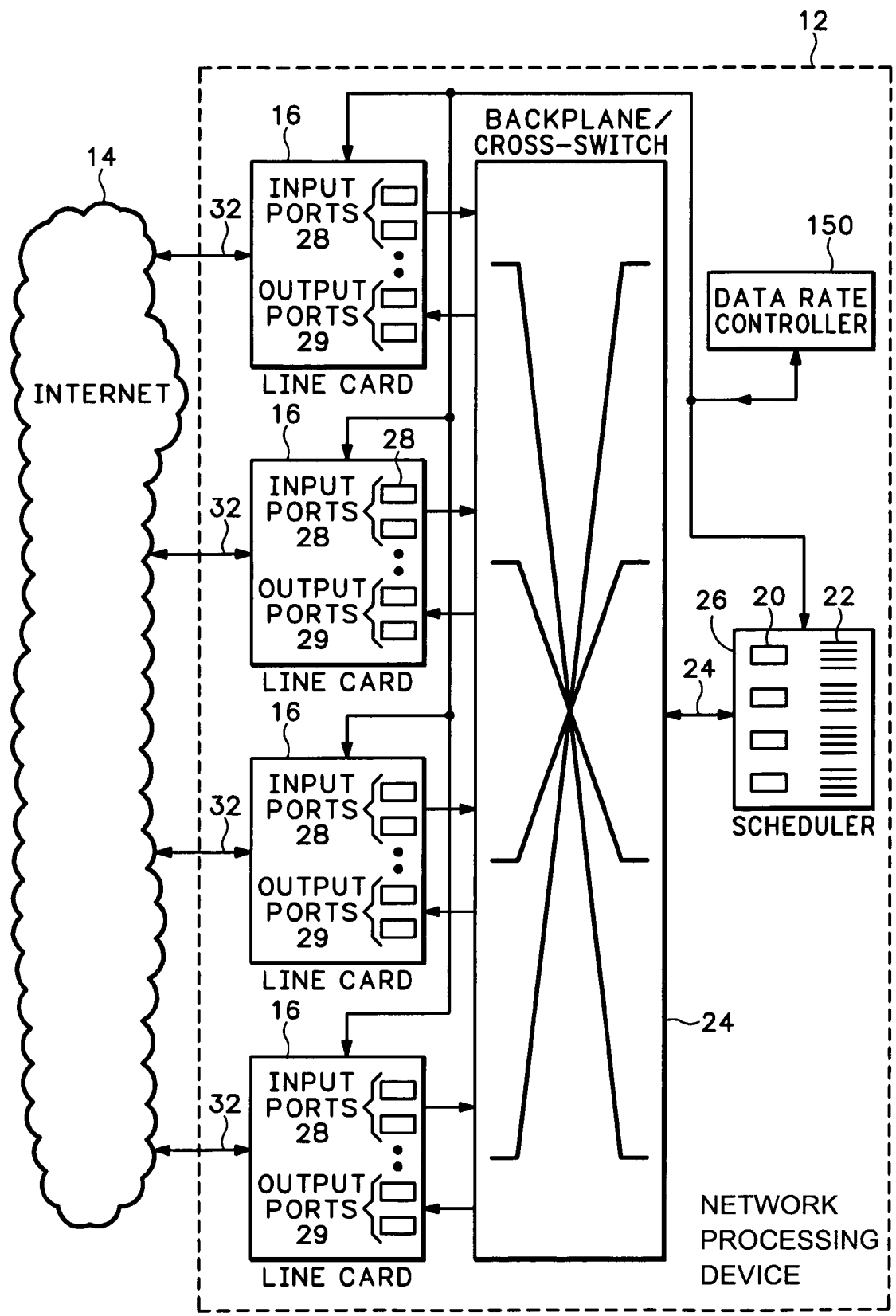
FIG. 11 is a block diagram of a network processing device that includes a data rate controller.

FIG. 11 shows one example of the second part of the multicast arbitration. As described in FIG. 9, the winning MCG for input port #1 has a multicast group vector of "011", a priority of three, and a weight of five. Only VOQ (1,1) and VOQ (1,2) send the highest multicast group priority/weight to arbiter(1) and arbiter(2), respectively. Input ports #2 and #3 similarly send the winning multicast group vectors from their respective input port arbitrations.

Each arbiter(i) is associated with one of the output ports and selects the highest priority and weight as the one to grant back to the input port. For example, arbiter(1) issues a grant to MCG(1,2), arbiter(2) issues a grant to MCG(1,2) and arbiter(3) issues a grant to MCG(2,1).

For input port(i), the grant is compared with the MCGV 112. In this case, MCGV 112 for MCG(1,2) has the bit pattern "011" which matches the grants received from arbiter(1) and arbiter(2). Accordingly, MCG(1,2) accepts the two grants and removes itself and the granted output ports from next iteration of scheduling arbitration. Only one grant is received by MCG(2,1) which does not match the MCGV "110". Therefore, input port #2 does not accept the grants from arbiter(3).

The output port arbitration is repeated once for each MCG. If there is any output port still unselected, one or more unicast arbitrations will be conducted in the same manner described above in FIG. 7. Unicast arbitration is conducted until no more connections can be matched.

The scheduler lists which input ports have accepted grants from output ports. After the completion of the current time slot, the schedule than reconfigures the cross switch (FIG. 1) to connect the input ports to the granted output ports. The input ports during the next time slot send the packets identified in VOQs to the connected output ports. The time slots can be from several microseconds to 100 microseconds. Therefore, there is sufficient time during the current time slot to conduct both the multicast and unicast arbitration for the next time slot.

The time slots can be programmed to be longer or shorter depending on current latency performance of the network processing device. Other network protocols, such as Asynchronous Transfer Mode (ATM) only send small packets at a short amount of time and therefore do not have sufficient time to conduct the multiple level multicast and unicast arbitration described above.

FIG. 11 is a diagram showing a data rate controller 150 that is used for controlling the rate that data is transferred across the switch fabric 24. The data rate controller 150 allocates bandwidth to individual input-output port connections for sending data over the switch fabric 24. The data rate controller 150 is used in conjunction with the network back plane scheduler 26 for balancing traffic load over switch fabric 24. The data rate controller 150 allocates bandwidth according to a time slot rate to police and shape the input port to output port traffic load.

For example, a first input port 28 (input port #1) may have highest priority and highest weight for the arbiter 20 associated with one of the output ports 29 (output port #3). Input port #1 would dominate the connection over cross-switch 24 with output port #3 for as long at input port #1 has the highest priority and weight data. This may create large latency for smaller low priority packets that need to be sent over output port #3.

The data rate controller 150 controls bandwidth usage for each input port-output port connection across cross switch 24. Thus, the input port #1—output port #3 connection is maintained for only as long as the data on input port #1 maintains the highest priority and/or weight and has not exhausted the peak bandwidth rate allocated by data rate controller 150. When the bandwidth allocation has been exhausted, the input port #1 is prevented from participating in the subsequent arbitrations for output port #3 until more bandwidth is allocated by data rate controller 150.

The data rate controller 150 also controls the data rate on a per output port basis. Each output port can receive data from multiple different VOQ's. If multiple VOQs send data to the same output port, the output port may not be able to handle the combined data rate. The data rate controller 150 can vary the percentage of bandwidth the VOQ are allowed to transmit data to the output ports.

Figure 12:
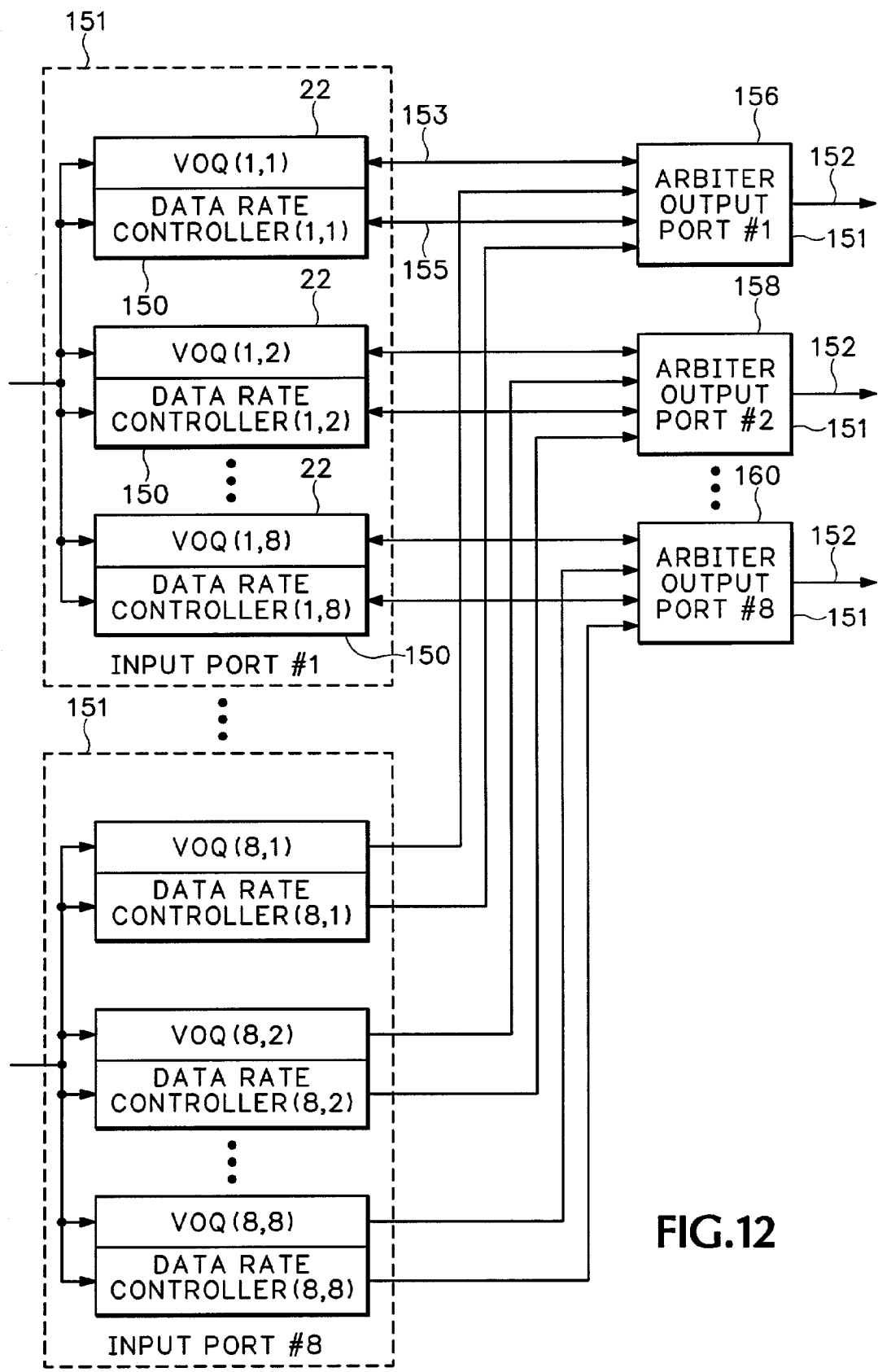
FIG. 12 is a block diagram of multiple data rate controllers each assigned to an Virtual Output Queue.

Referring to FIG. 12, in one example, there are 64 possible connections in switch fabric 24 between 8-input ports 151 and 8 output ports. Of course any number of input ports or output ports can be used. Each input port 151 has eight Virtual Output Queues (VOQs) 22 each associated with a different one of the eight output ports. There is one data rate controller 150 associated with each VOQ 22. Each data rate controller 150 controls the rate that packets for the associated VOQ 22 can transfer data over the switch fabric 24.

Each data rate controller 150 tracks a current bandwidth allocation for the associated input port VOQ 22. For example, data rate controller (1,1) identifies when input port #1 is connected to output port #1. The data rate controller (1,1) allocates bandwidth to the input port #1 when not connected to output port #1. When the input port #1 is connected to the output port #1, the data rate controller (1,1) reduces the bandwidth allocation.

The data rate controller 150 prevents that input port from participating in further output port arbitrations when the bandwidth allocation for a particular input port and output port connection has been used up. When more bandwidth is allocated, the input port is allowed to request connections to the output port.

For example, the VOQ (1,1) for input port #1 and the VOQ(8,1) for input port #8 may both request a connection via the arbiter 156 for output port #1. Data rate controller (1,1) may determine that VOQ (1,1) has exhausted its bandwidth allocation for output port #1. Data rate controller (1,1) disables VOQ(1,1) from participating in the arbitration in arbiter 156 for the next time slot. The data rate controller (1,1) disables VOQ(1,1) by disabling a request signal 153 to arbiter 156. The VOQ (8,1) would then be connected to output port #1.

In an alternative embodiment, data rate controller (1,1) disables VOQ(1,1) from participating in the next arbitration by sending an empty signal 155 to arbiter 156. When signal 155 is asserted, arbiter 156 ignores any asserted request signal 153 from VOQ (1,1).

The data rate controller (1,1) allocates additional bandwidth when input port #1 is not connected to output port #1. During the next time slot, the data rate controller(1,1) may allocate additional bandwidth to VOQ(1,1). If so, VOQ(1,1) can participate in the arbitration for the next time slot in arbiter 156 for output port #1. If the VOQ(1,1) is allowed to participate in the next arbitration and VOQ(1,1) wins the next arbitration in arbiter 156, then VOQ(1,1) will be reconnected to output port #1 through switch fabric 24 for the next time slot.

The data rate controllers 150 also control the data rate on a per output port basis. Each output port can receive data from multiple different VOQ's. If multiple VOQs send data to the same output port, the output port may not be able to handle the combined data rate. The data rate controller 150 varies a percentage of bandwidth that the associated VOQs are allowed to transmit data to the output ports to prevent the output ports from being overloaded.

Figure 13:
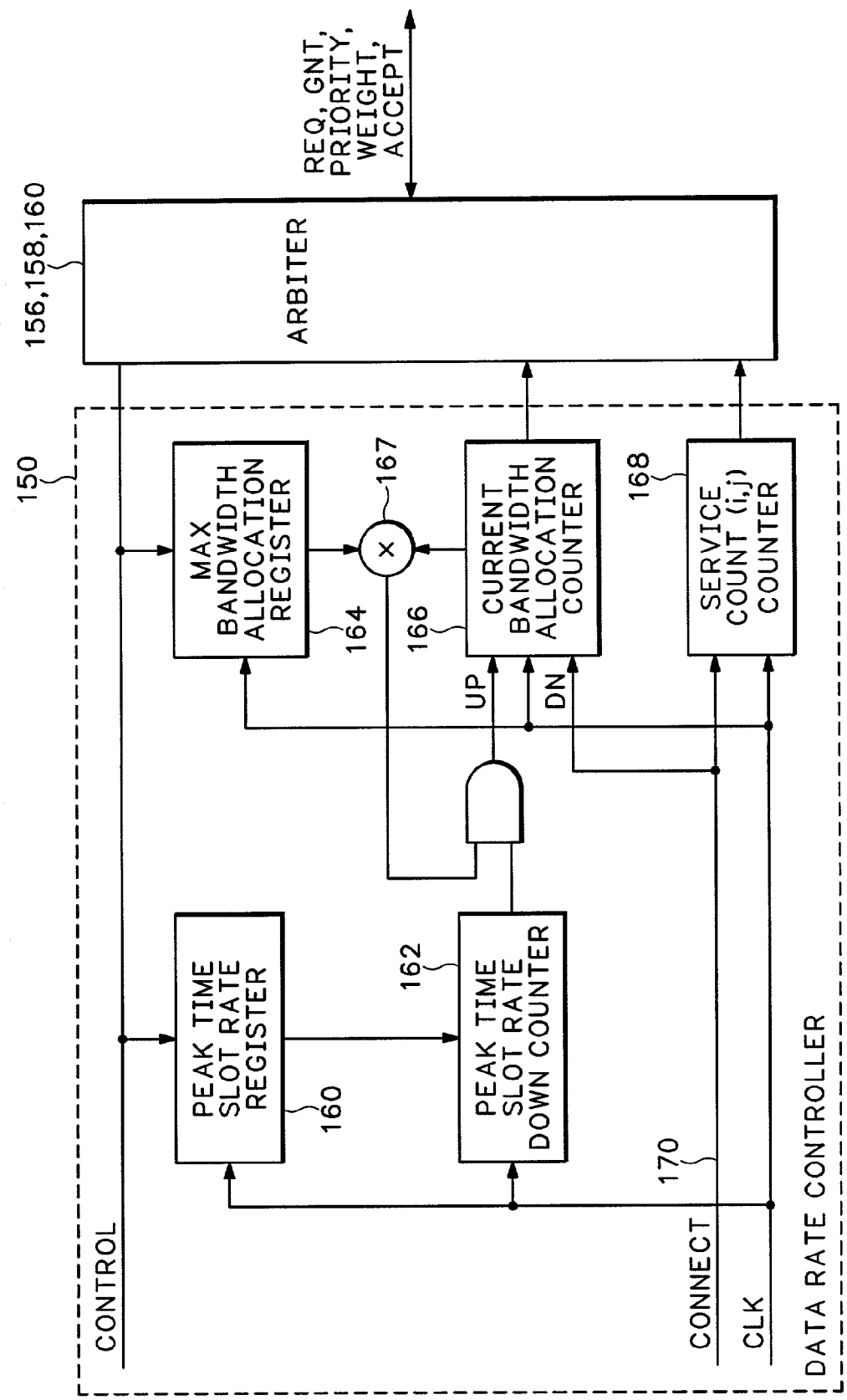
FIG. 13 is a detailed diagram for one of the data rate controllers.

FIG. 13 is a detailed diagram for one of the data rate controllers 150 shown in FIG. 12. A peak time slot rate register 160 identifies a clock rate value for allocating additional bandwidth to a current bandwidth allocation counter 166. A peak time slot rate down counter 162 counts down from the value stored in peak time slot rate register 160. When the value is counted down to zero, the down counter 162 generates a signal to the current bandwidth allocation counter 166 adding one bandwidth allocation for the associated input port. Down counter 162 then reads another peak time slot rate value from register 160 and begins counting down again.

A max bandwidth allocation register 164 contains a maximum allowable bandwidth allocation value that the input-output port can accumulate. If the current bandwidth allocation in counter 166 reaches the maximum allowable bandwidth allocation value in register 164, comparator 167 disables the down counter 162 from adding additional bandwidth allocations to the counter 166.

The current bandwidth allocation counter 166 indicates how much bandwidth is currently available for a particular input-output port. In one example, the counter 166 is decremented by one every time slot the input port(i) accepts a grant from the output port (j). The accepted grant is indicated on connect line 170. When the counter 166 counts down to zero, the input port(i) is prohibited from transmitting to output port (j) until another allocation is provided by down counter 162. The input port(i) is disabled by disabling an arbitration request 153 (FIG. 12) from input port(i) to output port(j).

In one example, the current bandwidth allocation counter 166 is token bucket based where each count down to zero by counter 162 adds one token to the current bandwidth allocation in counter 166. Tokens accumulated in the data rate controller 150 are then decremented by one for each time slot the input port(i) is connected to the output port(j).

A service count counter 168 tracks every time one of the input ports(i) accepts a grant from one of the output ports (j). The counter 168 includes a register that tracks all input port and output port connections. For example, in a network processing device having eight input ports and eight output ports, the counter 168 tracks for each time slot which of sixty-four different possible connections are established by the cross switch 24. These statistics are then used to observe the throughput for all sixty four input port-output port pairs.

Figure 14:
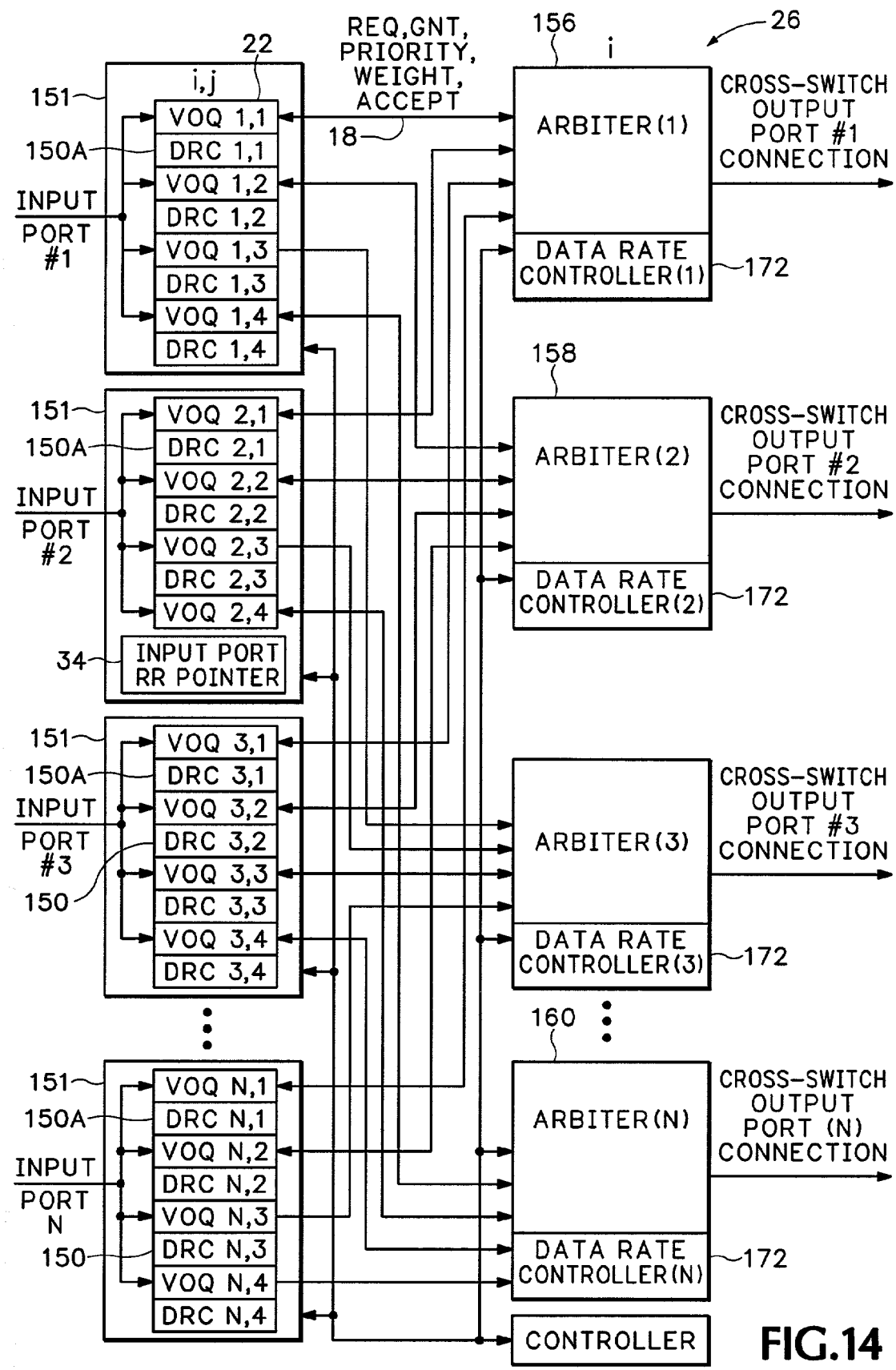
FIG. 14 is a block diagram sharing data rate controllers assigned to different output ports.

FIG. 14 shows a second set of data rate controllers 172 that are associated with each output port. The data rate controllers 172 each include circuitry similar to that shown in FIG. 13. However, each controller 172 is used to control the rate data is received at the output port from the different input ports. Each output port is allocated a particular amount of bandwidth. If the bandwidth allocation for that output port is exhausted, the data rate controller 172 for that output port prevents the arbiter 20 associated with that output port from granting the switching fabric 24 to any of the input ports.

For example, arbiter 156 arbitrates for each of the input ports requesting connection to output port #1. The data rate controllers 150A in each one of the input ports 151 control the data rate for each one of the possible connections between input ports #1–#N and output port #1. All of the input ports #1–#N combined may have enough data to exceed the capacity of output port #1. Data rate controller(1) controls the amount of data that can be received by output port #1.

The data rate controller (1) can use arbiter 156 to control the amount of received data. Each time the arbiter 156 sends a grant signal and receives back an accept signal over control bus 18, the data rate controller(1) decrements by one the bandwidth allocation for output port #1. When the output port #1 uses the current bandwidth allocation, data rate controller(1) prevents arbiter 156 from sending out any more grant signals. When additional bandwidth is allocated by data rate controller(1), arbiter 156 is then allowed to send grant signals to the VOQ (1,1), VOQ(2,1), VOQ(3,1), or VOQ(N,1) that wins the next arbitration.

Thus, the network processing device has two ways to control the data rate for connections over the switch fabric 24. The data rate controllers 150 control the data rate for individual input-output port connections. The data rate controllers 172 control the rate of all data received for a particular output port. The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or described features can be implemented by themselves, or in combination with other operations in either hardware or software.

Having described and illustrated the principles of the invention in a preferred embodiment thereof, it should be apparent that the invention may be modified in arrangement and detail without departing from such principles. Claim is made to all modifications and variation coming within the spirit and scope of the following claims.

The invention claimed is:

1. A data rate controller for controlling a rate that data is transferred over a backplane in a network processing device, comprising:
   a bandwidth allocator configured to allocate bandwidth to an input port for transmitting data over the backplane to an output port, the bandwidth allocator comprising a register that stores a programmable peak time slot rate value, and a counter that assigns an additional amount of bandwidth when the counter decrements the peak time slot rate value down to zero;
   a bandwidth limiter configured to identify a maximum allowable bandwidth the input port is allocated on the backplane; and
   a bandwidth tracker configured to identify an amount of bandwidth currently allocated to the input port for transmitting data over the backplane to the output port, the input port prevented from connecting to the output port when the current allocated bandwidth is used up.

2. A data rate controller for controlling a rate that data is transferred over a backplane in a network processing device, comprising:
   a bandwidth allocator configured to allocate bandwidth to an input port for transmitting data over the backplane to an output port;
   a bandwidth limiter configured to identify a maximum allowable bandwidth the input port is allocated on the backplane; and
   a bandwidth tracker configured to identify an amount of bandwidth currently allocated to the input port for transmitting data over the backplane to the output port, the input port prevented from requesting a connection to the output port when the current allocated bandwidth is used up, the bandwidth tracker including a counter that decrements the amount of bandwidth currently allocated when the input port is connected through the backplane to an output port and increments the amount of currently allocated bandwidth when the input port is not connected through the backplane to the output port, wherein the bandwidth tracker is disabled from counting up when the maximum allowable bandwidth has been reached.

3. A data rate controller for controlling a rate that data is transferred over a backplane that includes multiple input ports and multiple output ports in a network processing device, comprising:
   an arbitration circuit configured to arbitrate between input ports for connections to output ports;

a bandwidth allocator configured to allocate bandwidth to an input port for transmitting data over the backplane to an output port;

a bandwidth limiter configured to identify a maximum allowable bandwidth the input port is allocated on the backplane; and a bandwidth tracker configured to identify an amount of bandwidth currently allocated to the input port for transmitting data over the backplane to the output port, the input port prevented from connecting to the output port when the current allocated bandwidth is used up, the data rate controller one of multiple data rate controllers in the network processing device, the data rate controllers assigned respectively to each input-output port combination in the network processing device, wherein the bandwidth tracker prevents requests to the arbitration circuit for the input ports having exhausted bandwidth allocation.

4. A data rate controller according to claim 3 wherein each one of the input ports has associated virtual output queues each associated with a different one of the output ports and the virtual output queues each have associated data rate controllers.

5. A data rate controller according to claim 3, the arbitration circuit selecting the input ports for a next time slot according to both a priority and weight of packets at the input ports.

6. A data rate controller according to claim 5 wherein the arbitration circuit selects the input ports in a round robin order when two or more of the input ports have a same highest priority and a same largest weight.

7. A data rate controller according to claim 5 wherein the arbitration circuit conducts output port arbitrations for all of the virtual output queues dedicated to the same output ports and conducts input port arbitrations between the virtual output queues for the same input port issued grants during the output port arbitrations, the data rate controllers associated with the virtual output queues preventing participation in the output port arbitrations when bandwidth allocation associated with the virtual output queues is exhausted.

8. A method for controlling a rate that data is transferred over a switch fabric, comprising:

allocating bandwidth to input ports for transferring data to output ports over the switch fabric;

providing multiple input port buffers for each input port, each input port buffer associated with a different output port;

sending requests from the input ports for connecting to the output ports during a next time slot, wherein sending requests from a given input port comprises sending connection requests, from multiple ones of the input port buffers provided for the given input port, for connecting to the output ports through the switch fabric;

conducting arbitrations for the connection requests to determine which input ports are connected to which output ports;

increasing bandwidth allocation for the input ports that are not connected to the output ports for the next time slot;

decreasing bandwidth allocation for the input ports that are connected to the output ports for the next time slot; and p1 preventing the input ports from sending requests for the input ports when the bandwidth allocated to the input ports has been exhausted, wherein preventing the input ports from sending requests comprises disabling the input port buffers from sending connection requests when their allocated bandwidth has been used up.

9. A method according to claim 8 including identifying maximum bandwidth allocations for the input ports and disabling bandwidth allocation to the input ports that reach these maximum allowable bandwidth allocations.

10. A method according to claim 8 including providing a programmable amount of bandwidth allocation for the input ports.

11. A method for controlling a rate that data is transferred over a switch fabric, comprising:

selecting a bandwidth allocation to time slot period ratio;

allocating bandwidth to input ports for transferring data to output ports over the switch fabric;

assigning a bandwidth allocation value to the input ports according to the selected ratio;

sending requests from the input ports for connecting to the output ports during a next time slot;

increasing bandwidth allocation for the input ports that are not connected to the output ports for the next time slot;

decreasing bandwidth allocation for the input ports that are connected to the output ports for the next time slot; and preventing the input ports from sending requests for the output ports when the bandwidth allocated to the input ports has been exhausted.

12. A method according to claim 8 including:

identifying bandwidth allocated to the output ports for transferring data to a network; and preventing the output ports that have used up this allocated bandwidth from granting connections to the input ports.

13. A network processing device, comprising:

multiple input ports for receiving incoming packets;

multiple output ports for outputting packets;

a switch fabric coupled to the different input ports and the different output ports;

multiple virtual output queues associated with each one of the input ports, each one of the virtual output queues dedicated to a different one of the output ports;

a scheduler that configures the switch fabric for connecting the input ports to the output ports; and a set of data rate controllers associated with each one of the virtual output queues for controlling a data rate that the input ports can transfer data to the output ports over the switch fabric, wherein the data rate controllers prevent input ports that have exceeded a data rate limit from sending connection requests to the scheduler.

14. A network processing device according to claim 13 wherein packets are transferred over the switch fabric during time slots and the data rate controllers control data rate per time slot ratios between the input ports and output ports.

15. A network processing device according to claim 14 including a second set of data rate controllers that control a rate that data is received by the output ports from multiple input ports.

* * * * *

UNITED STATES PATENT AND TRADEMARK OFFICE
CERTIFICATE OF CORRECTION

PATENT NO. : 7,224,671 B2  
APPLICATION NO. : 09/930764  
DATED : May 29, 2007  
INVENTOR(S) : Lee et al.

Page 1 of 1

It is certified that error appears in the above-identified patent and that said Letters Patent is hereby corrected as shown below:

Column 5, line 2, "port roundrobin pointer" should read --port round-robin pointer--

Column 5, line 11, "of To multiple" should read --of multiple--

Figure 10:
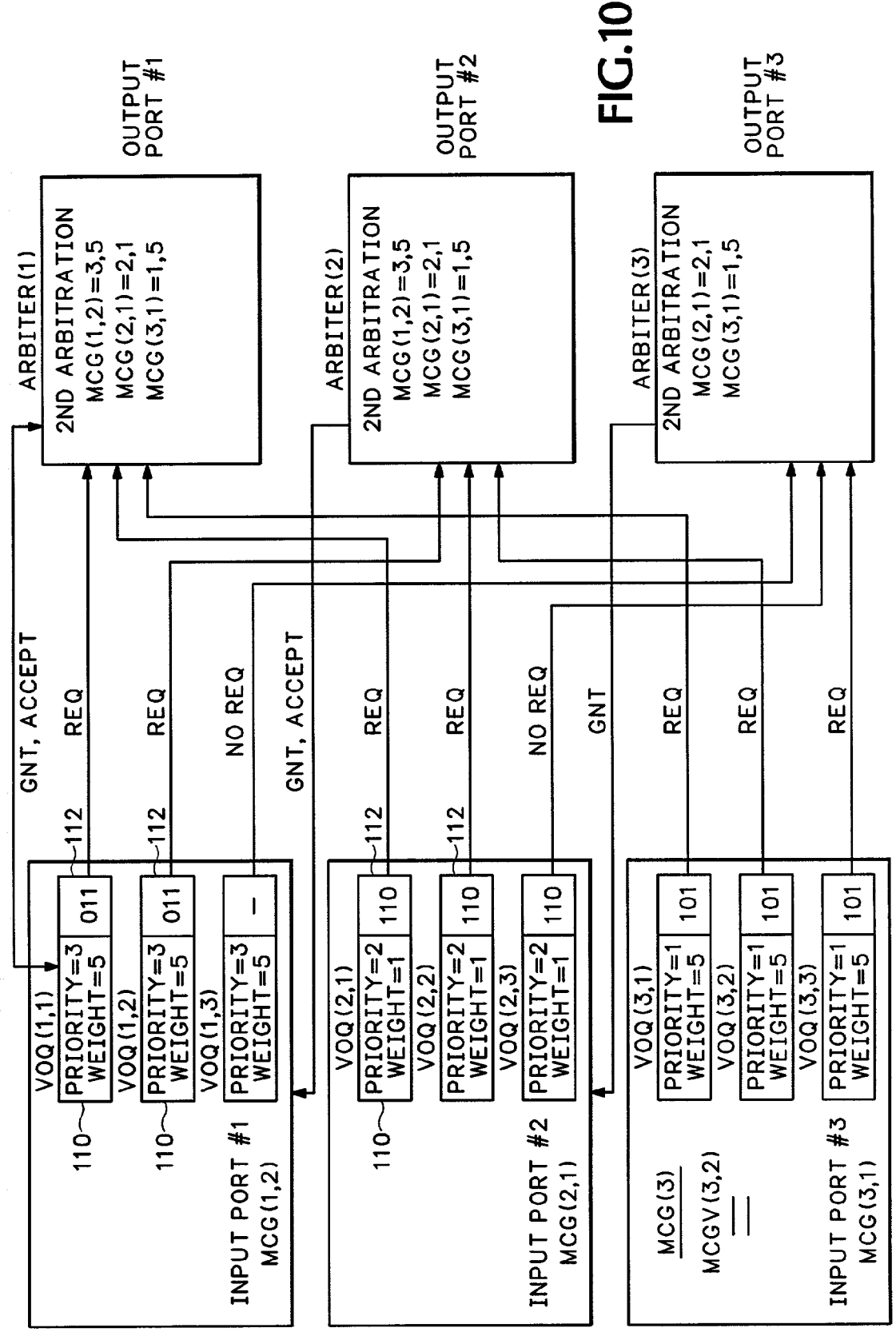
FIG. 10 is a block diagram showing one example of output port multicast arbitration.

Column 8, line 50, "FIG. 11 shows" should read --FIG. 10 shows--

Column 13, line 63, "and p1 preventing" should read --and preventing--

Signed and Sealed this

Eleventh Day of August, 2009

David J. Kappos
*Director of the United States Patent and Trademark Office*